United States Patent [19]

Muntzer et al.

[11] 3,986,889

[45] Oct. 19, 1976

[54] METHOD OF PRODUCING A MIXTURE OF BITUMEN AND SUBDIVIDED SOLID MINERAL MATTER

[75] Inventors: Emile Muntzer; Paul E. Muntzer, both of Strasbourg, France

[73] Assignee: WIBAU (WesDeutsche Industrie- und Strassenbaumaschinen-Gesellschaft m.b.H.), Rothenbergen, Germany

[22] Filed: May 15, 1975

[21] Appl. No.: 577,853

Related U.S. Application Data

[63] Continuation of Ser. No. 189,738, Oct. 15, 1971, which is a continuation-in-part of Ser. Nos. 862,909, Oct. 1, 1969, and Ser. No. 31,024, April 22, 1976.

[30] Foreign Application Priority Data

Oct. 15, 1968 Germany............................ 1803113

[52] U.S. Cl............................ 106/283; 106/273 R; 106/278; 106/280; 106/281 R; 259/3; 259/155; 259/157; 259/158

[51] Int. Cl.².................... C08L 95/00; C09D 3/24; B01F 15/00; B28C 1/22

[58] Field of Search............................ 106/273–284; 259/155, 157, 158, 3

[56] References Cited

UNITED STATES PATENTS

| 1,240,481 | 9/1917 | Popkess............................ 259/158 |
|---|---|---|
| 1,603,192 | 10/1926 | Chamberlain...................... 106/283 |
| 2,028,745 | 1/1936 | Hendrick.......................... 259/157 |
| 2,104,410 | 1/1938 | Baskin.............................. 106/280 |
| 2,188,798 | 1/1940 | Smith............................... 259/155 |
| 2,917,395 | 12/1959 | Csanyi......................... 106/283 UX |
| 3,206,319 | 9/1965 | Minnick et al..................... 106/119 |
| 3,423,222 | 1/1969 | McConnaughay................. 106/278 |
| 3,614,071 | 10/1971 | Brock................................ 259/3 |
| 3,693,945 | 9/1972 | Brock.............................. 259/158 |
| 3,832,201 | 8/1974 | Shearer............................ 106/281 |

FOREIGN PATENTS OR APPLICATIONS

| 346,515 | 4/1931 | United Kingdom............... 259/155 |
| 695,202 | 8/1953 | United Kingdom........... 106/281 R |

OTHER PUBLICATIONS

Roads and Road Construction Aug./Sept. 1972 pp. 253–254 "Dust–Free Coating of Black–Top Materials".

Primary Examiner—Joseph L. Schofer
Assistant Examiner—Herbert J. Lilling
Attorney, Agent, or Firm—W. G. Fasse; W. W. Roberts

[57] ABSTRACT

Method of producing a mixture of bitumen and subdivided solid mineral matter, comprising mixing pure bitumen with subdivided solid mineral matter containing moisture in at least such proportion as is picked up by the mineral matter from the atmosphere and heating the mixture to a temperature of about 120° to about 250° C.

11 Claims, No Drawings

METHOD OF PRODUCING A MIXTURE OF BITUMEN AND SUBDIVIDED SOLID MINERAL MATTER

This application is a continuation application of U.S. Ser. No. 189,738 filed Oct. 15, 1971, which in turn was a continuation-in-part application of Ser. No. 862,909 filed Oct. 1, 1969 and Ser. No. 31,024 filed Apr. 22, 1970.

BACKGROUND OF THE INVENTION

Methods for producing "hot-laid" bitumen-subdivided solid mineral matter mixtures are known in the art. In such prior art methods, the mineral matter, which generally has a moisture content of about 2% to about 6%, is heated to from about 120° C to about 250° C, for example in a drum apparatus, wherein it is dried prior to intermixture with the bitumen.

Subsequent to the drying step, the subdivided mineral components, which comprise a desired range of grain sizes, are preferably fed to a charge or batch mixer in which the mineral components are intermixed with bituminous binder components and possibly also with additives such as adhesives and the like. Additional mineral matter in the form of mineral dust or flour is introduced into the batch mixer where such addition is necessary for maintaining the desired mesh size distribution of the mineral matter mixture.

The addition of mineral dust or flour is especially required because during the drying the mineral components of fine grain size naturally present in the mineral matter mixture tend to be separated from the granules of coarser grain size. Such separation cannot be avoided due to the fact that hot gases are required for the drying step. The result of such separation is that there is a lack of the finest grain size in the mixture, which is especially disadvantageous in a mixture to be used for producing so-called asphalt concrete. Such lack of the finest grain size components must be compensated for by adding predetermined amounts of so-called foreign and/or feed back mineral matter having the desired finest grain size.

The above-described method which is generally employed in the art has several drawbacks.

First, it is imposible to avoid the large dust formation during the drying step. As a result, it is necessary to coordinate with the drying equipment, dust collection devices at substantial expense.

Second, it is necessary to handle the dust collected in the dust collection devices because such dust can be reused. Such handling involves transporting, storing and metering the dust as well as feeding the dust back in proper quantities to the material to be mixed. Due to the storage of the dust, it is impossible to avoid a temperature drop in the dust. Such temperature drop makes it rather difficult to achieve a flawless mixing with the bituminous binder components.

Third, it is quite frequently insufficient merely to return the amounts collected in the dust collection devices so that a make-up addition of mineral dust becomes necessary.

OBJECTS OF THE INVENTION

The make-up addition of mineral matter necessitates that the total quantity of mineral matter must be metered twice, first when a portion of the total amount of mineral matter is returned from the dust collection devices, and second when the amount of mineral matter which is lacking must be made up by providing a quantity of mineral matter to be fed in proper quantity into the mixer for making up the total amount required for the particular mixture.

In spite of the above-outlined technically cumbersome steps, it is not certain whether indeed the separate and subsequent addition of filler material restores the original grain size composition or distribution.

It is a main object of the invention to overcome the aforementioned drawbacks of the prior art.

It is a further object of the invention to assure that in a mixture of bituminous and subdivided mineral matter, the original grain size composition of the mineral matter is maintained during and even after the mixing.

Yet another object of the invention is to avoid the use of expensive dust collection devices and dust metering means.

SUMMARY OF THE INVENTION

A still further object of the invention is to avoid the addition of make-up mineral dust.

Briefly, according to the invention, the above objectives have been achieved in a method wherein the subdivided solid mineral matter is mixed with the bitumen and if desired also with additives such as adhesion agents, prior to the heating step for driving off the moisture from the mixture. Accordingly, in the present invention the mineral matter, as mixed with the bitumen, contains moisture in at least such proportion as is picked up by the mineral matter from the atmosphere. As noted above, this proportion is usually about 2 to about 6% of the weight of the mineral matter on a dry basis. Higher proportions are permissible without substantial visible accumulations of water.

The present method assures that the particles of finest grain size adhere to the moist subdivided mineral matter due to the moisture as long as the mineral matter is not heated to drive off the moisture. The particles or pieces ("units") of mineral matter are still moist, and thus still adhered together, until the bitumen and any additives become effective due to the subsequent heating step. The bitumen and any additives mixed therewith become effective because the heating step assures a homogeneous distribution of the bitumen on the surfaces of the mineral matter whereby the original binding between the particles of finer grain size and the coarser mineral particles or pieces due to moisture is replaced by a bituminous binding.

DETAILED DESCRIPTION OF EXAMPLE EMBODIMENTS

The present invention, in all embodiments, employs pure bitumen, i.e., bitumen which is neither cut nor emulsified. The proportion of bitumen may frequently be about 3 to about 10% of the weight of the subdivided solid mineral matter. However, other proportions of bitumen to subdivided solid mineral matter may be employed in accordance with well known practices as disclosed in, for example: *The Asphalt Handbook*, Revised Edition, The Asphalt Institute, March, 1960; *Asphalt*, Traxler, Reinhold Publishing Co., 1961; *Asphalt*, Barth, Gordon & Breach Science Publishers, 1962. The expression "pure bitumen" is not intended to exclude the presence of minor proportions of adhesion and rheological additives. Such additives and useful proportions thereof are well known in the prior art; see, for example, the Traxler text, supra, pp. 130 – 135 and the Barth text, supra, p. 624, et seq. and p. 646, et seq. There may be mentioned, for example, the addition of adhesion additives, such as of the fatty amine or metal salt types, in proportions of about 0.01 to about 1% of the total weight of the asphalt composition. The compositions and particle sizes of the subdivided mineral matter as well as the proportion of bitumen may range widely, in accordance with the prior art; in this respect reference may be made, for example, to the following sections of *The Asphalt Handbook, supra:* "asphalt concrete (§ 2.230); "heavy duty mineral asphalt concrete (§ 2.231); "sand-asphalt (§ 2.234); "asphalt macadam (§ 2.217); "mineral filler (§ 2.228); "mineral dust(§ 2.229); "macadam aggregate(§ 2.222); "graded aggregate (§ 2.223); "coarse aggregate(§ 2.224); "fine aggregate (§ 2.225); "dense-graded aggregate (§ 2.226); "open-graded aggregate (§ 2.227).

Any pure bitumen may be employed in the present invention, the term "bitumen" being well recognized (see, for example, Kirk-Othmer, *Encyclopedia of Chemical Technology*, 2nd Ed., 1963, p. 762). For paving purposes, the preferred bitumen is "asphalt cement", i.e., asphalt refined to meet the specifications for paving purposes, having a normal penetration of between 40 and 300 (see § 2.105, Table IV-1 and § 3.102 of *The Asphalt Handbook, supra*). Pure bitumens are solid or semisolid and must be heated to render them liquid. In the present invention, the bitumen is heated to temperatures in the range of about 120° to about 250° C for mixing with the subdivided solid mineral matter and laying of the mixture for paving.

As noted above, the average unit sizes of the subdivided solid mineral matter is in accordance with conventional practice. Typically, the average unit size of the mineral components of any particular grade employed is not greater than about 35 mm. In practice, mixtures of several different grades, graded by unit size, of subdivided solid mineral matter are frequently employed, for example, up to 2 mm., 2–5 mm., >5–8 mm., >8–12 mm., >12–18 mm., and so forth. For paving purposes, a preferred embodiment of the present invention, dense-graded aggregate is preferred. Dense-graded aggregate, in accordance with conventional practice, consists of a number of mineral component fractions or grades, varying from relatively large particles or pieces downwardly in size to dust. The proportion of dust relative to the other components is so selected that the compacted aggregate has voids of only the approximate size of the dust particles.

The addition of the bitumen to the solid mineral matter can be accomplished in a suitable manner by loosening the solid mineral matter particles, while mixing them with the bitumen and any desired additives.

The loosening of the subdivided mineral matter can be accomplished, for example, in a rotating drum or by blowing the granular mineral components into a mixing chamber.

It is also desirable that the bitumen be brought into contact with the subdivided mineral matter in a finely distributed manner. This can be accomplished by spraying the bitumen in its heated, liquified state, into the mixing chamber, preferably into a rotating mixing chamber.

It has been found in practicing this invention that it is especially advantageous to accomplish the mixing by feeding the bitumen in heated, liquid state and any desired additives in liquid state, either simultaneously or sequentially into the solid mineral matter by dispersing the liquid components to assure their finest distribution and, thus, their uniform distribution, for example, as mentioned above by spraying. In connection with the intermixing of additives with the mineral matter it is preferable to perform such intermixing prior to the mixing of the bitumen with the subdivided mineral components.

In another advantageous aspect of the invention, the additives are added either prior to or simultaneously with the addition of the bitumen to the subdivided mineral matter.

The present method, according to the invention, is especially useful for the preparation of bitumen-subdivided solid mineral matter mixtures for construction purposes, that is, for producing asphalt mixtures having widely differing compositions such as are used for road construction.

In addition, the present invention is also useful in any area where mixtures having a similar composition are used, for example, in the production of tamped mixtures and compositions comprising a bituminous binder. Such compositions and mixtures may, for example, be used for producing bricks for the lining of converters or the like.

It is a special advantage of the invention that dust production, which is unavoidable in the prior art, has been eliminated completely by the invention due to the fact that the mineral particles of finer size remain bound to the larger particles or pieces first by the moisture and then by the bitumen. Thus, according to the invention, the mixing equipment does not require any dust collection devices.

Another advantage of the invention is seen in the fact that make-up mineral matter storage, supply and metering means, which have been unavoidable in the prior art, have been obviated by the invention, which results in substantial savings as well as in a technical advance relative to the prior art.

In accordance with another aspect of the invention, it has now been found that the process of manufacturing bitumen-mineral matter mixtures, especially for construction purposes, can be further improved if between the processing step of mixing the bitumen, which may contain an additive or additives such as an adhesive agent, with the mineral solids and the step of heating the resultant mixture, to drive off the moisture, liquify the bitumen and cause the bitumen to adhere to the mineral matter, that is, the step of activation, the mixture formed in the first step is stored for a period of time preferably at ambient temperature.

In this connection, it is also advantageous that this permits the processing steps of the mixing and the heating or activation to be also spatially separated.

The interval of time by which the two steps can be separated can amount to from 30 minutes up to 1 year and longer. Separation periods of 4 to 6 months have proved advantageous in connection with production scheduling.

After the mixing the material is stored and, when required, is heated and activated, preferably close to the site of application.

The practice of the process in accordance with the invention wherein the separation of the steps of mixing and heating, i.e., activation of the mixtures, is effected, permits a further substantial reduction in the troublesome industrial health problems. Moreover, beyond this there results the possibility of setting up the entire operation so as to permit substantially simpler transportation arrangements. Thus, for instance, where weather conditions are involved, i.e., in the spring, autumn and winter, there can be realized economies if during times of low activity the intermediate product can be produced for storage and this intermediate product can be stored for later use. The storage has not only the feature of permitting economies but also of permitting the obtaining of an improved product.

The following examples will serve to illustrate the invention but are not to be construed as in any way limiting the same.

EXAMPLE 1

A mixture having the following composition, by weight, was prepared and heated to a temperature of 180° C:

18.0% split basaltic rock >8–12 mm.
16.0% split basaltic rock >5–8 mm.
16.0% split basaltic rock >2–5 mm.
20.7% crushed sand 0–2 mm.
18.0% natural sand 0–2 mm.
5.3% limestone powder 0–.009 mm.
6.0% bitumen of normal penetration 80

This mixture was satisfactorily used for road paving purposes.

EXAMPLE 2

A mixture having the following composition, by weight, was prepared:

23.5% split basaltic rock >5–8 mm.
18.8% split basaltic rock >2–5 mm.
22.5% crushed sand 0–2 mm.
18.8% natural sand 0–2 mm.
10.3% limestone powder 0–.009 mm.
6.1% bitumen of normal penetration 80

0.04 wt. % of a basic chromium sulfate was added to the mixture as adhesion agent. This mixture was stored in this form for 4 months. It was then introduced into a heating installation located 300 km. from the plant and therein heated and activated at a temperature of 160° C. with further mixing. The resultant bituminous mixture was satisfactorily used for road paving purposes.

What is claimed is:

1. A method for producing a mixture of bitumen and mineral aggregate consisting of mixing without heating cold, moist aggregate at ambient temperatures with liquid bitumen, the aggregate containing moisture at least in such proportion as is picked up by the aggregate from the atmosphere, whereby the mineral particles of finest grain size adhere to the moist mineral granules of coarser size during the mixing due to their being moist said aggregate having an upper moisture limit of about 6% by weight, and after the mixing heating the mixture to a temperature sufficient for driving off moisture from the mixture, whereby the original adhering or binding between the particles of finer grain size and the coarser mineral particles due to moisture, is replaced by a bituminous binding.

2. The method according to claim 1, wherein the moisture content of the aggregate is about 2 to about 6% by weight, based on the weight of the dry aggregate.

3. The method according to claim 1, wherein the proportion of bitumen is about 3 to about 10% of the weight of the aggregate.

4. The method according to claim 1 wherein the particle size of the aggregate is up to 33 mm.

5. The method according to claim 1, wherein an adhesion additive is mixed with the aggregate.

6. The method according to claim 5, wherein the proportion of the adhesion additive is about 0.01 to about 1% of the weight of the entire mixture.

7. The method according to claim 1, wherein the bitumen has a normal penetration of 40 to 300.

8. The method according to claim 1, wherein the bitumen and the aggregate are mixed together at ambient temperature, the mixture is maintained at ambient temperature without further mixing and then the mixture is subjected to said heating.

9. The method according to claim 8, wherein the mixture is maintained at ambient temperature for a period of at least about 30 minutes.

10. The method according to claim 1, wherein said heating to drive off moisture involves raising the temperature of the mineral aggregate bitumen mixture to a range of about 120° C to about 250° C.

11. The method according to claim 1, wherein said mixing of the cold, moist aggregate with the liquid bitumen is accomplished by spraying the liquid bitumen into a mixing chamber, such as a rotating mixing chamber, the rotation of which loosens the cold, moist aggregate as it is sprayed with liquid bitumen and then performing said heating step.

* * * * *

UNITED STATES PATENT OFFICE
CERTIFICATE OF CORRECTION

Patent No. 3,986,889  Dated October 19, 1976

Inventor(s) Emile Muntzer et al

It is certified that error appears in the above-identified patent and that said Letters Patent are hereby corrected as shown below:

[73] Assignee: WIBAU (Westdeutsche Industrie- und Strassenbau Maschinengesellschaft m.b.H.), Rothenbergen, Germany

[63] Related U. S. Application Data
Continuation of Ser. No.189,738, Oct. 15, 1971, which is a continuation-in-part of Serial Nos. 862,909, Oct. 1, 1969, and Serial No. 31,024, April 22, 1970.

Signed and Sealed this

Fifteenth Day of February 1977

[SEAL]

Attest:

RUTH C. MASON
*Attesting Officer*

C. MARSHALL DANN
*Commissioner of Patents and Trademarks*